US009928935B2

(12) United States Patent
Yin et al.

(10) Patent No.: US 9,928,935 B2
(45) Date of Patent: Mar. 27, 2018

(54) ELECTRICAL INSULATION SYSTEM (71) Applicant: General Electric Company, Schenectady, NY (US)

(72) Inventors: Weijun Yin, Niskayuna, NY (US); Lili Zhang, Niskayuna, NY (US); Lionel Durantay, Frouard (FR); Jean François Grignard, Nancy (FR)

(73) Assignee: GENERAL ELECTRIC COMPANY, Schenectady, NY (US)

(*) Notice: Subject to any disclaimer, the term of this patent is extended or adjusted under 35 U.S.C. 154(b) by 1184 days.

(21) Appl. No.: 13/907,102

(22) Filed: May 31, 2013

(65) Prior Publication Data
US 2014/0353000 A1 Dec. 4, 2014

(51) Int. Cl.
*H01B 3/04* (2006.01)
*H01B 3/30* (2006.01)
(Continued)

(52) U.S. Cl.
CPC .............. *H01B 3/04* (2013.01); *H01B 3/30* (2013.01); *H01B 13/08* (2013.01); *H01F 5/06* (2013.01);
(Continued)

(58) Field of Classification Search
CPC ... H01B 3/04; H01B 3/30; H01B 3/40; H02K 3/04; H02K 3/14; H02K 3/30; H02K 3/34;
(Continued)

(56) References Cited

U.S. PATENT DOCUMENTS 4,760,296 A   7/1988 Johnston et al.
5,393,929 A   2/1995 Yagihashi et al.
(Continued)

FOREIGN PATENT DOCUMENTS

CN   1455978 A   11/2003
CN   1992100 A   7/2007
(Continued)

OTHER PUBLICATIONS

Kuimov et al. "Current Trends of Production Development as Regards to the Electrical Insulation Materials for HV Electrical Machines Winding Insulation: Test Results on Long-Term Electrical Strength", Conference Record of the 2000 IEEE International Symposium on Electrical Insulation, Anaheim, CA USA, Apr. 2-5, 2000, p. 532-534.
(Continued)

*Primary Examiner* — Timothy Thompson
*Assistant Examiner* — Paresh Paghadal
(74) *Attorney, Agent, or Firm* — Nitin N. Joshi (57) ABSTRACT

A system and a method are presented. The system includes an electrically conducting material and an electrical insulation system. The electrical insulation system includes a layered insulation tape that has a first layer and a second layer. The first layer includes a mica paper and a binder resin in a range from about 5 wt % to about 12 wt % of the insulation tape. The second layer includes a composite of layered nanoparticles dispersed in a polyetheretherketone (PEEK) matrix. The second layer laminates the first layer. The method includes attaching the first layer and the second layer with or without the addition of further resin; using the layered insulation tape as a turn insulation and ground wall insulation for an electrically conducting material; and impregnating the system with a nanofiller-incorporated resin
(Continued)

by a vacuum pressure impregnation method, to form an insulation system within the system.

9 Claims, 6 Drawing Sheets

(51) Int. Cl.
| | |
|---|---|
| *H01B 13/08* | (2006.01) |
| *H02K 3/40* | (2006.01) |
| *H01F 5/06* | (2006.01) |
| *H01F 41/12* | (2006.01) |
| *H02K 3/42* | (2006.01) |
| *H02K 3/32* | (2006.01) |
| *H02K 3/34* | (2006.01) |
| *H02K 3/44* | (2006.01) |

(52) U.S. Cl.
CPC ............ *H01F 41/122* (2013.01); *H02K 3/40* (2013.01); *H02K 3/32* (2013.01); *H02K 3/34* (2013.01); *H02K 3/42* (2013.01); *H02K 3/44* (2013.01); *Y10T 428/251* (2015.01)

(58) Field of Classification Search
CPC ............ H02K 3/40; H02K 3/32; H02K 3/325; H02K 3/345; H02K 3/38; H02K 3/42; H02K 3/44
See application file for complete search history.

(56) References Cited

U.S. PATENT DOCUMENTS

| | | | |
|---|---|---|---|
| 5,801,334 A | 9/1998 | Theodorides et al. | |
| 5,861,578 A | 1/1999 | Hake et al. | |
| 5,973,269 A | 10/1999 | Draper et al. | |
| 5,989,702 A | 11/1999 | Draper et al. | |
| 6,190,775 B1 | 2/2001 | Smith et al. | |
| 6,238,790 B1 | 5/2001 | Smith et al. | |
| 6,288,341 B1* | 9/2001 | Tsunoda .................. H02K 3/40 174/120 C |
| 6,359,232 B1 | 3/2002 | Markovitz et al. | |
| 6,750,400 B2 | 6/2004 | Younsi et al. | |
| 6,989,173 B2 | 1/2006 | Smith et al. | |
| 7,015,260 B2 | 3/2006 | Meloni | |
| 7,033,670 B2 | 4/2006 | Smith | |
| 7,268,293 B2 | 9/2007 | Smith et al. | |
| 7,309,526 B2 | 12/2007 | Smith et al. | |
| 7,547,847 B2 | 6/2009 | Miller | |
| 7,553,438 B2 | 6/2009 | Smith et al. | |
| 7,553,781 B2 | 6/2009 | Smith et al. | |
| 7,579,397 B2 | 8/2009 | Nelson et al. | |
| 7,592,045 B2 | 9/2009 | Smith et al. | |
| 7,651,963 B2 | 1/2010 | Smith et al. | |
| 7,655,295 B2 | 2/2010 | Smith et al. | |
| 7,776,392 B2 | 8/2010 | Smith et al. | |
| 7,781,057 B2 | 8/2010 | Smith et al. | |
| 7,781,063 B2 | 8/2010 | Smith et al. | |
| 7,846,853 B2 | 12/2010 | Stevens et al. | |
| 7,851,059 B2 | 12/2010 | Stevens et al. | |
| 7,875,347 B2 | 1/2011 | Irwin et al. | |
| 7,947,128 B2 | 5/2011 | Conley et al. | |
| 7,955,661 B2 | 6/2011 | Stevens et al. | |
| 2003/0035960 A1* | 2/2003 | Tsunoda .................. B32B 27/20 428/413 |
| 2005/0016658 A1 | 1/2005 | Asokan et al. | |
| 2005/0142349 A1* | 6/2005 | Irwin ...................... B32B 15/20 428/323 |
| 2005/0274450 A1* | 12/2005 | Smith ...................... H01B 3/12 156/187 |
| 2007/0026221 A1* | 2/2007 | Stevens ................... C09K 5/14 428/325 |
| 2008/0097027 A1 | 4/2008 | Zhang et al. | |
| 2008/0284262 A1 | 11/2008 | Nelson et al. | |
| 2009/0145610 A1* | 6/2009 | Varkey ................. E21B 17/206 166/335 |
| 2010/0264761 A1* | 10/2010 | Durantay ................. H02K 3/30 310/55 |
| 2011/0100674 A1* | 5/2011 | Pagliuca ................. C08L 71/00 174/110 SR |
| 2011/0207863 A1 | 8/2011 | Yin et al. | |
| 2012/0080970 A1 | 4/2012 | Yin et al. | |
| 2012/0169172 A1* | 7/2012 | Anderton ................ H02K 3/30 310/214 |
| 2014/0028140 A1* | 1/2014 | Mabuchi ................ H02K 3/345 310/180 |
| 2014/0087617 A1* | 3/2014 | Ryniers ................... B32B 15/20 442/232 |
| 2014/0102758 A1* | 4/2014 | Pagliuca ................. B32B 27/08 174/120 SR |
| 2014/0246929 A1* | 9/2014 | Francese ................. H02K 3/30 310/52 |

FOREIGN PATENT DOCUMENTS

| | | | |
|---|---|---|---|
| CN | 101189686 A | 5/2008 | |
| DE | 10227559 | * 10/2003 | ............... H02K 3/30 |
| DE | 10227559 A1 | 10/2003 | |
| WO | 2006118536 A1 | 11/2006 | |
| WO | 20120020846 A1 | 2/2012 | |

OTHER PUBLICATIONS

"Industrial Power Engineering Handbook" by KC Agrawal, Winding insulation and its maintenance published by Newnes on Oct. 8, 2001, pp. 9/222-9/224.

Wang et al., "Effect of Nano-Fillers on Electrical Breakdown Behavior of Epoxy Resin", Electrical Insulation and Dielectric Phenomena (CEIDP), 2010 Annual Report Conference , Issue Date : Oct. 17-20, 2010, ISSN : 0084-9162, pp. 1-4.

Unofficial English Translation of Chinese Office Action issued in connection with corresponding CN Application No. 201410239471.8 on Mar. 3, 2016.

European Search Report and Written Opinion issued in connection with corresponding EP Application No. 14168499.3 on Oct. 27, 2016.

* cited by examiner

ELECTRICAL INSULATION SYSTEM

BACKGROUND

The invention relates generally to electrical insulation systems. More particularly, some embodiments of the invention relate to electrical insulation systems including multi-strand, multi-turn conductor winding insulation and ground wall insulation, in a medium or high voltage rotating machine.

With the use of any electrical machines, there is a need to electrically insulate the conductors in the machines. The need for electrical insulation in the machines increases with higher operating voltages. With increasing use of pulse width modulated (PWM) drives, electric machines experience premature electrical failure caused by higher electrical stress on winding insulation, due in part to uneven voltage distribution under high dV/dt conditions. One way to address insulation deficiency is to increase insulation build. However, this can lead to large machine size and poor heat conduction. Thus, a better insulation system that can enable reduction of electrical machine size for high power applications is desired.

Another need within an electrical machine is thermal energy dissipation. Therefore, there is a need for thermally conductive electrical insulators in medium or high voltage electrical machines. Further, insulation systems with higher mechanical strength and thermal stability are sometimes very desirable.

Traditionally, various epoxy resins, mica tapes, or glass fibers were used in electrical insulation systems. However, microvoids may be created during the impregnation or curing of the epoxy resins, leading to poor thermal conduction and partial discharge. Further, the partial discharge resistance of epoxy resins or pure polymer films may be lower than required for certain electrical machines. Mica tapes and glass fibers may not have the mechanical stability required for the robust performance of the electrical machine.

Mica tape made of mica paper with polyester film demonstrated good taping quality and high breakdown strength. However it can be deficient, in terms of long term voltage endurance, due to the poor corona resistance of polyester film. Mica tape made of mica paper with fiberglass is known to have good long term voltage endurance performance, but can have poor taping quality and lower dielectric breakdown strength. The thermal conductivity of mica tape may be increased by adding thermally conductive particulates to the binding resin. This is particularly suitable for resin-rich mica tape, for heat press or autoclave processes, but may not be good for mica tape that is used in vacuum pressure impregnated (VPI) machines, for high power applications.

Therefore, there is a need for a comprehensive approach to the electrical insulation system of medium to high voltage electrical machines, e.g., those that operate in the range of about 4160 V to 15000 V.

BRIEF DESCRIPTION

In one embodiment, a system is presented. The system includes an electrically conducting material and an electrical insulation system. The electrical insulation system includes a layered insulation tape that has a first layer and a second layer. The first layer includes mica paper and a binder resin in a range from about 5 wt % to about 12 wt % of the insulated tape. The second layer includes a composite of layered nanoparticles dispersed in a polyetheretherketone (PEEK) matrix. The second layer laminates the first layer.

In another embodiment, a system is also presented. The system includes strands of an electrically conducting material and an electrical insulation system. The electrical insulation system includes a strand insulation, a turn insulation, and a ground wall insulation. The strand insulation includes a composite of layered nanoparticles in a PEEK matrix and insulates the strands of the electrically conducting material. The turn insulation and ground wall insulation include a layered insulation tape. The layered insulation tape includes a first layer and a second layer. The first layer includes a mica paper and a binder resin from about 5 wt % to about 12 wt % of layered insulation tape. The second layer includes a composite of layered nanoparticles dispersed in a polyetheretherketone (PEEK) matrix. The second layer laminates the first layer in the insulation tape. The insulation system further includes a vacuum impregnated resin that includes nanofillers in a range from about 0.1 Wt % to about 5 Wt %.

Yet another embodiment includes a method of forming an insulation system. The method includes incorporating mica paper and a binder resin to form a first layer; incorporating layered nanoparticles in a PEEK matrix to form a second layer; forming a layered insulation tape by attaching the first layer and the second layer; shaping the layered insulation tape as a turn insulation and ground wall insulation for an electrically conducting material in a system; and impregnating the system with nanofiller-incorporated resin, using a vacuum pressure impregnation method to form an insulation system within the system.

DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Embodiments of the present invention describe a system including electrically conducting materials; and electrical insulation systems surrounding the electrically conducting materials.

One or more specific embodiments of the present invention are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the following specification and the claims that follow, the singular forms "a", "an" and "the" include plural referents unless the context clearly dictates otherwise.

Approximating language, as used herein throughout the specification and claims, may be applied to modify any quantitative representation that could permissibly vary, without resulting in a change in the basic function to which it is related. Accordingly, a value modified by a term such as "about" is not to be limited to the precise value specified. In some instances, the approximating language may correspond to the precision of an instrument for measuring the value.

Figure 1:
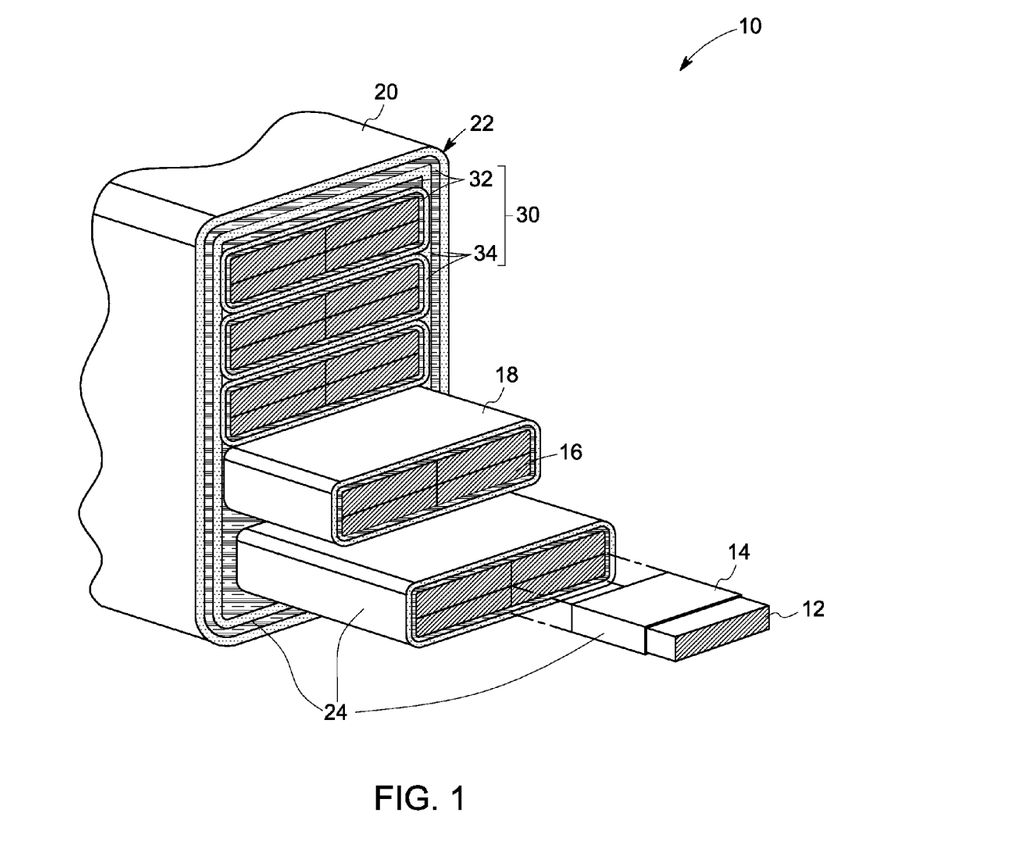
FIG. 1 is a schematic diagram of a multi-strand, multi-turn conductor, according to one embodiment of the invention.

A medium voltage (4 kV to 15 kV) inverter may be used in different applications such as fans, compressors, pumps, mixers, extruders, wind turbines, wind and water tunnels, mine winders, conveyors, test benches, high speed drives for oil and gas, drives for marine, naval, and metals industry, for example. The medium voltage inverters need to be compact, and have high efficiency performance and reliability. A wide-ranging, reliable insulation system would aid in extending the use of medium voltage electrical machines. FIG. 1 is a schematic representation of an electrical system 10. The system 10 includes an electrically conducting material 12 for passing electrical current between medium or high voltage points. Copper, aluminum, silver, gold, or any other good conductor of electricity may be used as a conducting material 12. The electrically conducting material 12 may be in the form of a strand having an outer insulation cover, such as strand insulation 14, on each strand of the electrically conducting material 12. Traditionally the strand insulation 14 includes varnish, enamel compounds, or glass. In one embodiment of the invention, the strand insulation 14 for each individual conductor 12 includes a corona resistant nano composite enamel or extruded coating. The conductor 12 may be fused with a polymeric film that is filled with nanoparticles of mineral or metal oxides.

The particle size of the nanoparticles in the film may vary, depending on the nanoparticle compositions. In one embodiment, the average size of the nanoparticle in the polymeric film varies in a range from about 1 nm to about 100 nm. As used herein, the average size of a nanoparticle is the distribution of the particles as observed in particle imaging techniques, and measured along the smallest dimension of the particle. For example, if the particles are of circular shape, the smallest dimension is the diameter of the sphere, while if the particles are "plate" shaped, the greatest dimension is the length of the plate; and the smallest dimension is the thickness of the plate. Further, "average" is the calculated mean of the particle sizes observed during imaging, or the median value of the particle distribution curve. In a further embodiment, the average size of the nanoparticle in the dielectric fluid varies in a range from about 5 nm to about 50 nm.

The insulated strands may be grouped together and wound in the form of turns 16 in the machine, having a turn to turn insulation 18, referred hereinafter as turn insulation 18. Thus, the turn insulation 18 separates a group of insulated conductor strands. The conductor strands 12 with a turn insulation 18 may be referred to as turn insulated conductor strands. The turn insulation 18 may also be referred to as a phase-to-phase insulation between adjacent coils in different phase groups. A failure of turn insulation 18 could lead to turn-to-turn electrical shorts.

The turn insulated conductor strands would typically be wrapped with another insulation that would provide insulation from the electrical ground. The wrapped form may be housed inside a casing 20. The insulation between the numerous turns and the casing 20 is termed as "ground wall insulation" 22. An electrical insulation system 24 of the system 10 usually includes at least three sections or portions: the strand insulation 14, turn insulation 18, and the ground wall insulation 22.

The turn-to-turn shorts are one of the more prevalent and potentially destructive electrical faults in inverter-driven AC machines such as induction motors, for example. Arising primarily from insulation degradation (through contamination or abnormal thermal, mechanical, electrical or other environmental stresses), these localized faults produce thermal hot spots that foster progressive degradation, and may mature into turn-to-ground faults, thereby breaking the ground wall insulation 22.

As the voltage ratings of machines tend to reach higher levels, improved ways to increase the gradients for electrical potentials need to be developed without increasing the thickness of the insulation. In rotating machines especially, the turn insulation is formed as an insulating tape or wrapper surrounding the group of individual conductors which have been formed into a predetermined shape to form a coil. The turn insulation is further made of a layer of mica tape. Flakes of mica provide an insulation resistance to corona discharge, which tends to increase as operating voltage levels of the rotating machines increase.

Addition of particles of alumina or silica to polymeric compositions of strand or turn insulation may be advantageously used to enhance the corona resistance of the insulation, and may further improve the heat transfer characteristics of the conductor insulation.

In one embodiment, the electrical insulation system 24 includes a layered insulation tape 30 (FIG. 1, 2, 3) having at least two layers. A first layer 32 of the tape 30 may include mica paper and a binder resin. A second layer 34 comprises a composite of layered nanoparticles dispersed in a polyetheretherketone (PEEK) matrix.

Mica generally has a crystalline structure and forms layers that can be split or delaminated into thin sheets as mica paper. These sheets are chemically inert, dielectric, elastic, flexible, hydrophilic, insulating, lightweight, reflective, refractive, resilient, and range in opacity from transparent to opaque. Mica is stable when exposed to electricity, light, moisture, and extreme temperatures. It has superior electrical properties as an insulator and as a dielectric, has a high dielectric breakdown, is thermally stable up to about 500° C., and is resistant to corona discharge. Specifically, mica is unusual, in that it is a good electrical insulator while also being a good thermal conductor.

The binder resin may bind the mica papers together to be used in the form of a mica tape as the first layer. In one embodiment, the amount of the binder resin in the mica tape is in a range from about 2 wt % to about 10 wt %. In an alternate embodiment, the amount of the binder resin in the mica tape is in a range from about 3 wt % to about 6 wt %.

In one embodiment, the binder resin present in the mica tape may include nanofillers. The nanofillers may include alumina, silica, titania, boron nitride, aluminum nitride, aluminum silicates, nanoclay, or talc.

Mechanical properties of mica allow it to be cut, punched, stamped, and machined to close tolerances. Mica needs a strong mechanical carrier (alternately, "backing layer") that provides good mechanical strength for its application in medium and high voltage machines. Therefore, the mechanical durability of the first layer 32 (FIG. 2) of mica tape may be enhanced by supporting the first layer with a polymer film. Polymer films have excellent flexibility and breakdown strength, and hence the mica tape may be laminated with the film to provide good mechanical strength for wire wrapping processes. However, the generally used polymer films may degrade in the presence of a partial discharge or corona. The films may erode and become a weak link in the insulation system 24. Hence, in one embodiment of the present invention, a second layer 34 comprising a PEEK film is used as a backing for the first layer 32 having the mica tape.

PEEK is a semicrystalline thermoplastic polymer having a glass transition temperature of about 143° C., and a melting point around 343° C. PEEK has excellent mechanical and chemical resistance properties that are retained well above room temperature. PEEK is highly resistant to thermal degradation, and further has good thermal conductivity that increases with temperature. Using PEEK as a support for mica tape would increase the thermal and corona stability of the insulation system 24.

Further, it was envisaged by the inventors that using nanocrystalline mineral filled PEEK composite instead of pure PEEK film as the support (carrier) would enhance the heat transfer and voltage endurance of the insulation tape. In one embodiment, the nanocrystallines that are present in the PEEK film have a layered structure. As used herein, the layered structure of a nanocrystalline material may be assessed through the basal cleavage ability of its crystal structure. A material that has a perfect or near-perfect basal cleavage in any one crystal plane is generally considered as having a layered structure. In one embodiment, the layered nanoparticles have an aspect ratio in a range from about 10 to about 100. As used herein, the aspect ratio is defined as the ratio of length (longest dimension) to the thickness (shortest dimension) of a single layer. In one embodiment, the aspect ratio is in a range from about 20 to about 100.

Figure 2:
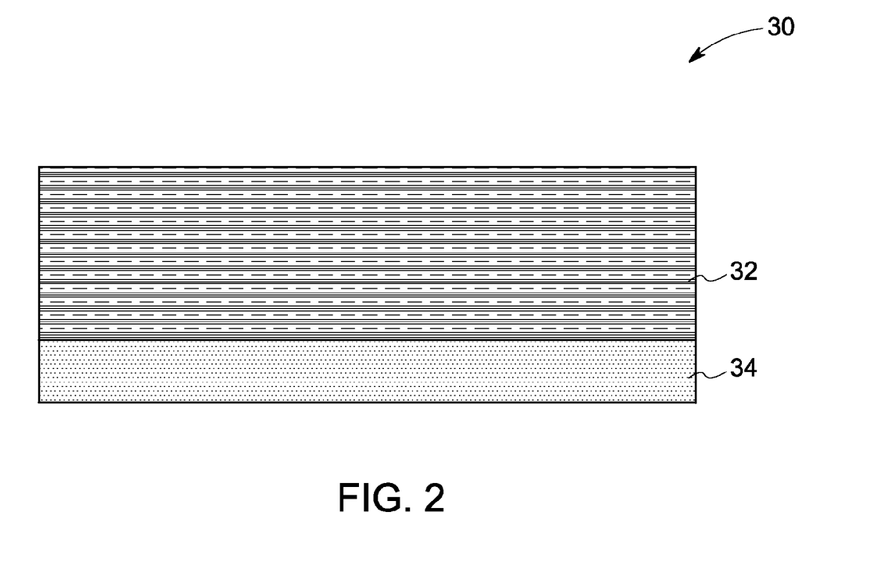
FIG. 2 is a schematic cross-sectional representation of a layered insulation tape, according to one embodiment of the invention.

Nanoclay and talc are two examples of layered materials that may be readily embedded in the PEEK film when the PEEK film is used as a carrier for the mica layer. As used herein, nanoclays are nanoparticles of layered mineral silicates. In one embodiment, along with using the PEEK film for the insulation tape 30, the strand insulation 14 is fused with the PEEK film that is filled with layered nanoparticles of mineral or metal oxides.

Clay may be a combination of one or more clay minerals, mostly composed of phyllosilicate minerals. The most abundantly available clay in nature may include kaolinite, montmorillonite-smectite, illite, and chlorite. Clay minerals are normally built of tetrahedral silicate sheets and octahedral hydroxide sheets, with either a 1:1 ratio of tetrahedral to octahedral sheets, or with 2:1 ratio of tetrahedral to octahedral sheets. Another of the nanoparticles described above, talc, is a mineral that is generally composed of hydrated magnesium silicate, and has a monoclinic or triclinic crystal system. Talc is said to have a perfect basal cleavage on a {001} plane.

The composite of PEEK film and the layered nanoparticles may include nanoparticles in a range from about 10 wt % to about 40 wt % of the second layer 34. The percentage of the layered nanoparticles in the second layer 34 of PEEK composite is in a range from about 10 wt % to about 40 wt %, based on the total weight of the PEEK and layered nanoparticles. In one embodiment, the composite may include layered nanoparticles in a range from about 20 wt % to about 30 wt % of the second layer 34.

Figure 3:
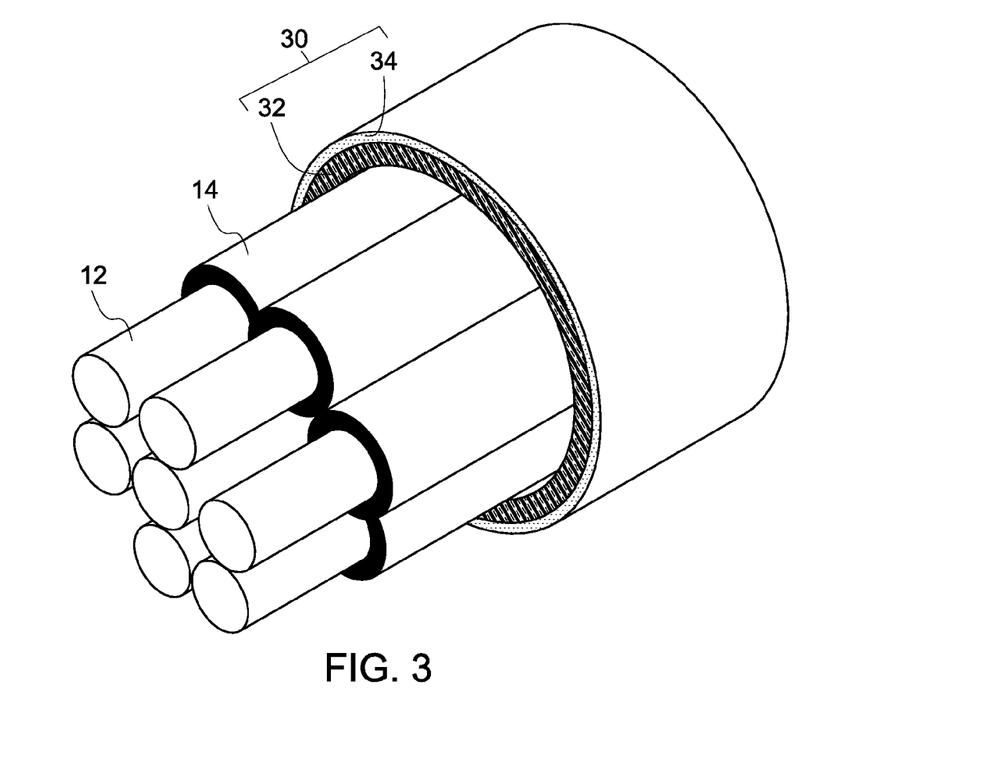
FIG. 3 is a schematic cross-sectional representation of a turn insulation insulating a strand insulated conducting material, according to one embodiment of the invention.

The first layer 32 of the insulation tape 30, having the mica tape, may be positioned to be proximate to the electrical conductor material 12. In one embodiment, the first layer 32 is in contact with the electrically conducting material 12, as shown in FIG. 3. As used herein, "in contact with the electrically conducting material 12" would include a physical contact with the insulated electrically conducting material 12, but does not necessarily mean that the layer 32 is in electrical communication with the electrically conducting material 12. For example, there could be an intervening, electrical-insulation layer present, such as the strand insulation 14, and hence the first layer 32 of the insulation tape 30, having the mica tape, may be positioned to be proximate to the strand insulated electrical conductor material.

The second layer 34 having the PEEK composite may be adjacent to the first layer 32, laminating the first layer 32. The first layer 32 and the second layer 34 may be laminated with or without using a binder resin. In an embodiment, the binder resin present in the first layer 32 is sufficient to join the second layer 34 with the first layer 32. In one embodiment, the first layer 32 is directly joined to the second layer 34 to form the layered insulation tape 30. As used herein, "directly joined" implies that the first layer 32 is attached to the second layer 34 without specifically using any binder or any other material in-between the two layers.

In an alternate embodiment, a small amount of a binder resin may be used in-between the first layer 32 and the second layer 34 for laminating. The binder resin that is used for laminating the first layer 32 with the second layer 34 may or may not be same as the binder resin that is used in the mica tape. In one embodiment, the amount of the binder resin in the insulation tape 30 is in a range from about 3 wt % to about 10 wt %. In a specific embodiment, the amount of the binder resin in the insulation tape 30 is in a range from about 5 wt % to about 12 wt %, and in some preferred embodiments, the amount is in the range from about 8 wt % to about 10 wt %.

In one embodiment, the first layer 32 is sandwiched between the strand insulated conductor 12 and the second layer 34. In an exemplary embodiment, the second layer 34 enfolds the first layer 32. As used herein, the enfolding of the first layer 32 by the second layer 34 means that the second layer 34 substantially covers one surface of the first layer 32. In the sandwich arrangement, one surface of the first layer 32 may be open to the strand insulated conductor and the other, opposite surface may be completely covered by the second layer 34.

As used herein, the depiction of the layers in FIG. 3 is used for illustration, and may be interchanged, depending on the applications. For example, the layer 34, having a PEEK composite, may be adjacent to the electrically conducting material 12 or the strand insulated conductor, and layer 32, including mica tape, may enfold the layer 34. Further the first layer 32 and the second layer 34 may include many sub-layers within, and in one embodiment, there are several alternate layers of first 32 and second 34 layers in an insulation tape 30 (FIGS. 1, 2 and 3). The layered insulation tape 30 may be used as turn insulation 18, ground wall insulation 22, or both.

In one embodiment, the insulation system having the strand insulation 14, turn insulation 18 (FIGS. 1, 3), and ground wall insulation 22 (FIG. 1), is further impregnated by a resin having nanofillers (nanofiller-incorporated resin), using a vacuum pressure impregnation method. Vacuum pressure impregnation processes are known in the art, and described, for example, in the book *Industrial Power Engineering Handbook* By K C Agrawal, published by Newnes on 8 Oct. 2001, pages 9/222-9/224. In one embodiment, the vacuum pressure impregnation method is used to impregnate the whole system 10, so that the nanofiller-incorporated resin is impregnated throughout the system. This method of impregnating the entire system is sometimes termed a "global vacuum impregnation" method. The nanofiller-incorporated resin impregnation becomes a part of the insulation system 24 within the system 10 (FIG. 1), further aiding the reduction of air gaps in the system 10. The resin used in the global vacuum pressure impregnation of the system 10 may be the same or different from the binder resin used along with the mica paper in the first layer 32 (FIGS. 2 and 3).

The nanofillers used in the vacuum pressure impregnation step may include alumina, silica, titania, boron nitride, aluminum nitride, aluminum silicates, nanoclay, and talc. Adding a small amount of nanofillers to the binder resin may alter the resin viscosity.

The surface of these nano fillers may be functionalized. "Functionalization" refers to a method of increasing the reactivity of the nanofiller surface. Functionalization may be accomplished by a surface coating or treatment with a functionalizing agent, which reacts with sites on the surface of the nanofillers, increasing the activity of those sites. In one embodiment, the nanofillers were treated with silane functional groups to facilitate the compatibility of the nanofillers with the host resin, so as to maintain resin viscosity as low as pure resin.

The average particle size of the nanofillers may be less than about 100 nanometers, and further, may be less than about 50 nanometers. As used herein, the average size of a nanofiller is the distribution of the particles as observed in particle imaging techniques, and measured along its smallest dimension. Further, "average" is the calculated mean of the particle sizes observed during imaging. The nanofillers may be finely dispersed in the binder resin. In one embodiment, some of the nanofillers may be agglomerated. The average size of the agglomeration of nanofillers may be less than about 1 micrometer.

The nanofillers-filled resin ("nano-filled resin" for brevity) impregnated in the insulation system by the global vacuum pressure impregnation method may fill-in most of or all of the gaps in the insulation system 24 itself, and may also fill any gaps between the conductor 12 and the insulation system 24. Therefore, the nano-filled resin may be impregnated between the conductor 12 and the strand insulation 14; between the strand insulation 14 and the turn insulation 18; and between the turn insulation 18 and the ground wall insulation 22. One example of the possible gap in the electrical system 10 is between the strand insulated conductor 12 coils (alternately "coil gaps").

The amount of the nanofillers in the global vacuum impregnated resin may be in a range from about 0.1 Wt % to about 5 Wt %, and in some specific embodiments, in the range from about 0.5 Wt % to about 3 Wt %, based on the total weights of resin and nanofillers. This amount of nanofillers is very low, as compared to levels normally used in vacuum-impregnated resins. In the past, the nanofillers were added to increase the thermal conductivity of the overall insulation system by using the enhanced thermal conductivity of the nanofillers as compared to the resin material. Therefore, it was surprising to learn that relatively low amounts of nanofillers could be effective in this insulation system, since prior experience appeared to show a requirement for increasing amounts of nanofillers in order to achieve increasing levels of thermal conductivity".

The mechanism of increasing the insulation by using a small amount (less than 5 wt %) of nanofillers in the global vacuum impregnated resin discussed herein is different from the mechanism for the above-mentioned, earlier used nanofiller addition. The low amount of nanofillers in the resin used herein assists in resin retention in the coil gap, by lowering the viscosity drop as compared to the pure resin, during heat ramping to curing or baking temperature. Because of the low viscosity drop, the undesirable run-off of resin during the curing process is minimized. With enhanced resin filling in coil gaps, the air pockets are reduced, and the effective thermal conductivity of the insulation is increased. This can lead to better heat transfer. In addition, the nano-filled resin increases corona resistance, and prolongs voltage endurance, aiding in the enhancement of the service life of the system 10.

Examples

The following examples illustrate methods, materials and results, in accordance with specific embodiments, and as such should not be construed as imposing limitations upon the claims. All components are commercially available from common chemical suppliers.

The processability, manufacturability, dielectric capability, viability, and moisture and $H_2S/CO_2$ resistance of an exemplary insulation tape and nano-filled, global vacuum impregnated resin was tested for the application of a medium voltage rotating machine insulation.

A PEEK film (Aptiv™ 1000), mineral filled PEEK film (Aptiv™ 1102, Aptiv™ 1103), and a pure epoxy (class H resin, Epoxylite™, Von Roll™ 3407) with nanofillers ($Al_2O_3$, $TiO_2$, $SiO_2$), were used as samples for testing. The AC breakdown strength, dissipation factor, and pulse endurance of the pure epoxy vs. nano-filled epoxy; and PEEK film vs. mineral filled PEEK film, were compared. Epoxy curing characteristics, such as curing onset temperature, heat of reaction, viscosity, and thermal stability, were studied. Mineral filled PEEK film was characterized by viewing the filler structure images by SEM, and determining the chemical composition of fillers. The chemical resistance of the PEEK film vs. mineral filled PEEK film was compared by measuring in a 1% $H_2S$, 1% $CO_2$, 1% $CH_4$ and 97% $N_2$, 5% $H_2O$ atmosphere.

Figure 4:
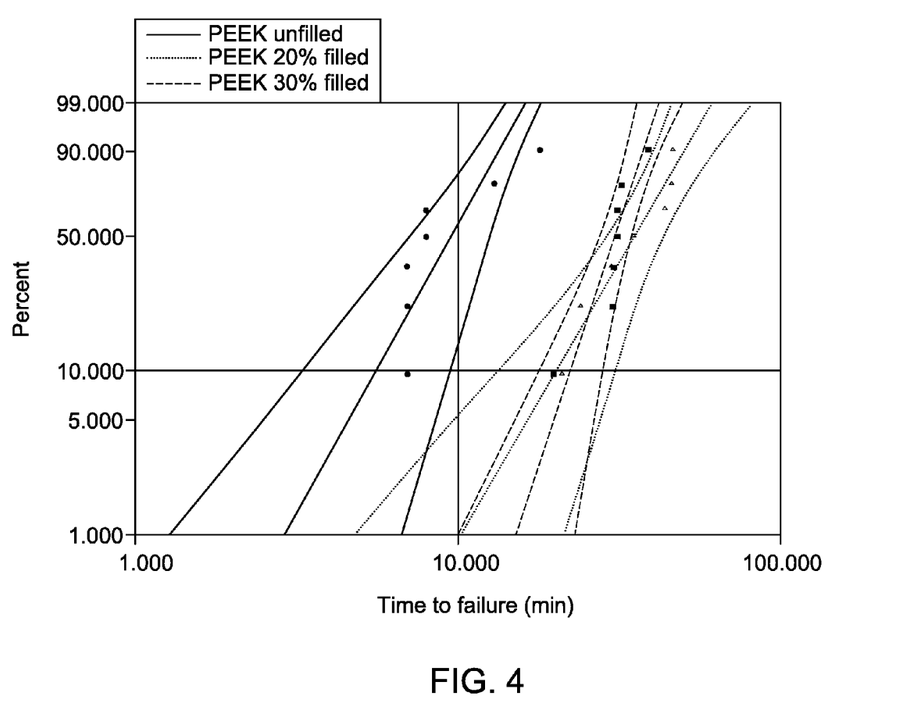
FIG. 4 is a comparative graph of the pulse endurance of PEEK film and talc-filled PEEK film.

When the glass transition temperature (Tg), frequency response of dielectric constant and loss tangent, and dielectric strength of the PEEK film were compared with that of mineral filled PEEK films, there was not much observable change because of the addition of layered nanoparticles. However, there was about a "3×" improvement in the pulse endurance for the talc filled PEEK films that had a thickness of about 25 μm as compared to the PEEK film (same thickness) without any nanoparticles, as shown in FIG. 4. No significant difference was observed between 20% and 30% filler concentrations of talc filled PEEK films of the above mentioned thickness. The pulse endurance test was conducted at 1.2 kV, 20 kHz switching frequency, with a duty cycle of 50% and dV/dt of 20 kV/µs. All of the test results were collected at STP with relative humidity (RH) ranging from 30% to 50%. The upper electrode was a ¼ inch diameter ball electrode. The bottom electrode was a 4 inch diameter flat disk.

Figure 5:
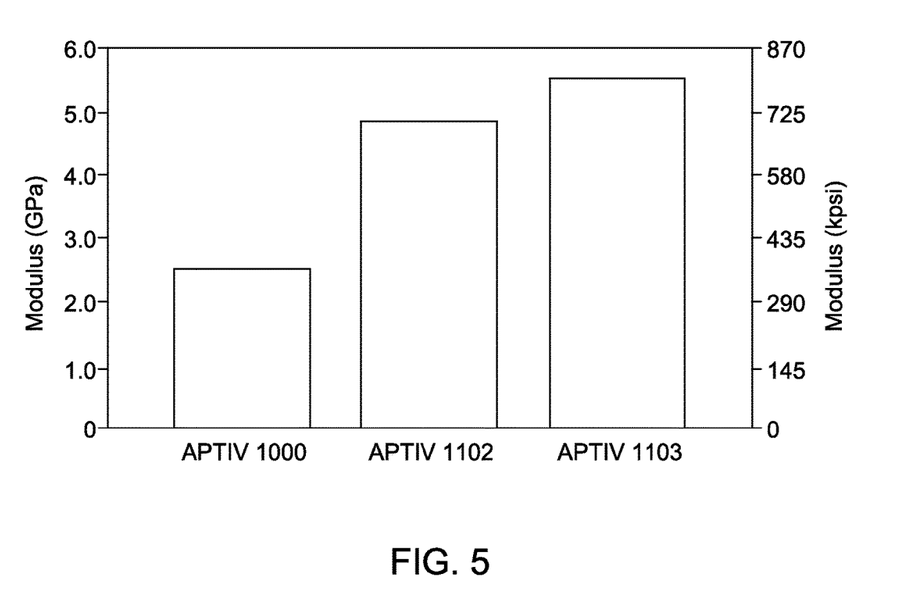
FIG. 5 is a comparative graph of the tensile modulus of a PEEK film and a talc filled PEEK film.

Further, a comparison was made for the samples of talc-filled PEEK film of about 50 µm thickness, as compared to that of unfilled films of the same thickness. An approximate 10× improvement in pulse endurance at 1.6 kV pulse voltage was observed, as shown in Table 1, along with at least 30% higher thermal conductivity, as shown in Table 2, and about a 100% increase in the tensile modulus, as shown in FIG. 5. Mineral fillers present in the film are layered structure flakes. Therefore, thermal conductivity of the mineral filled PEEK films (APTIV1102 and APTIV 1103) is highly anisotropic. Hence there are differences in the ASTM E-1461 standard thermal conductivity value of the in-plane (along the plane) and through plane (perpendicular to the film plane) measurements.

TABLE 1

| Film ID | Time-to-failure at 1.6 kV |
|---|---|
| 1000 (unfilled) | 32 min |
| 1102 (20%) filled | 394 min |
| 1103 (30%) filled | 320 min |

TABLE 2

Thermal conductivity of mineral filled PEEK vs. unfilled PEEK

| Thermal Conductivity | Units | APTIV 1000 | APTIV 1102 | APTIV 1103 |
|---|---|---|---|---|
| In-Plane | W/(m-K) | 0.32 | 0.91 | 1.3 |
| Through Plane | W/(m-K) | 0.29 | 0.43 | 0.61 |

Figure 6A:
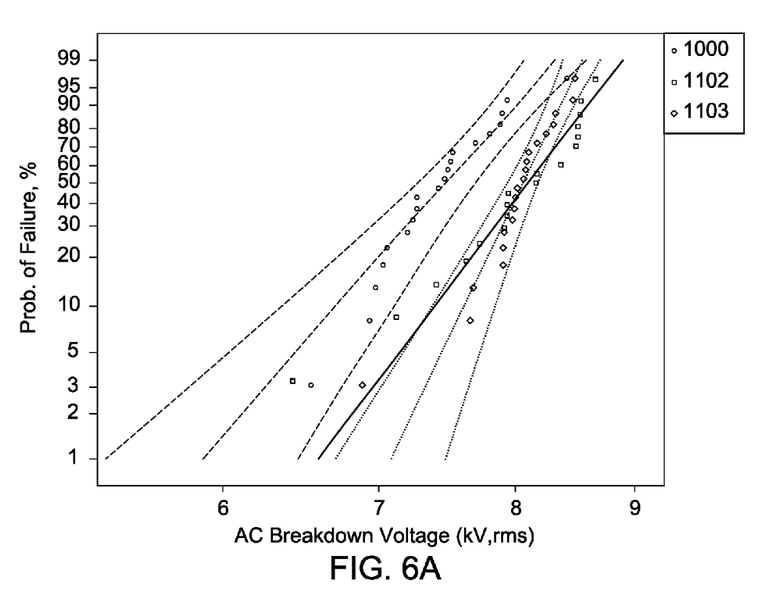
FIG. 6A is a graph of AC Breakdown voltage of a virgin PEEK film.
Figure 6B:
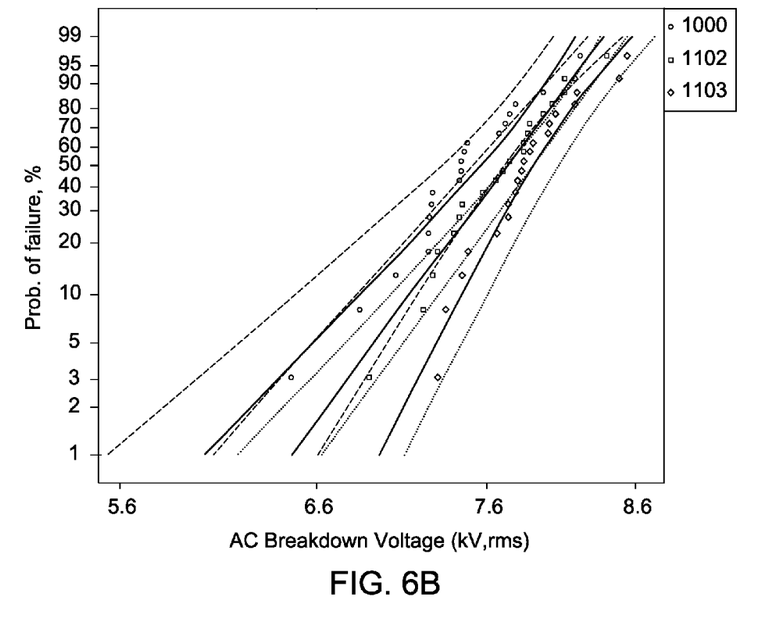
FIG. 6B is a graph of AC Breakdown voltage of an aged PEEK film.

Further, the mineral filled PEEK films exhibited equally good chemical resistance as compared to the unfilled PEEK film, when tested at the corrosive gas environment at a temperature of about 150° C., and a pressure of about 150 bars. The AC dielectric strength of both mineral filled and unfilled PEEK films did not show appreciable change after corrosive environment aging, as seen from FIGS. 6A and 6B. Therefore, when the talc filled PEEK film is used as turn insulation and ground wall insulation in conjunction with mica paper, machine performance enhancement in both the corona resistance and heat transfer improvement is expected.

Epoxylite™ 006-0841 from Elantas and Von Roll™ 3417 from Von Roll were used as the resin for global vacuum pressure impregnation, and nanomaterials of silica, alumina and titania were added as the nanofillers. The resins, without and with the nanofillers, were compared. The properties of nanofillers added are as listed in Table 3.

TABLE 3

| Nanofillers | Supplier | Primary Size (nm) | Surface Are (m$^2$/g) | Silane Treatment |
|---|---|---|---|---|
| Fumed silica | Degusa | <10 | 200 +/−25 | Yes |
| Nano alumina | Nanophase | 40-50 | 32-40 | Yes |
| Nano titania | Nanophase | 40 | 45 | Yes |

Figure 7:
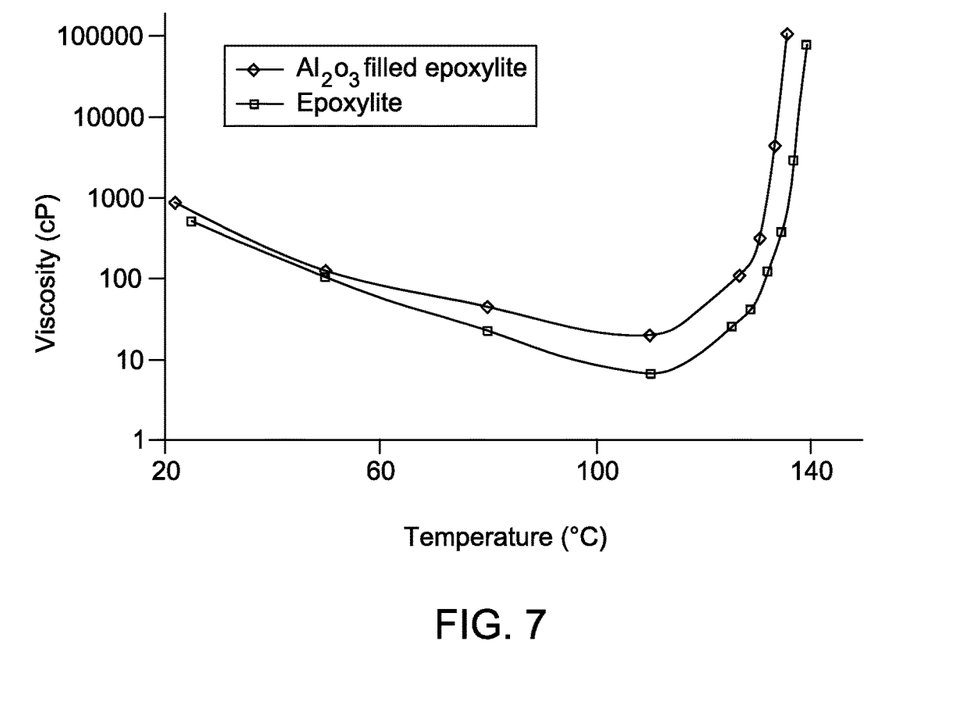
FIG. 7 is comparative graph of the viscosity of epoxy resin and PEEK film that is filled with layered nanoparticles.

The addition of nanofillers does not affect the heat of reaction, Tg, or thermal stability, but has a positive effect on the viscosity, as seen from FIG. 7. This positive effect on the viscosity is expected to result in reduced resin run-out, decreased air pockets, and better heat transfer. This property further aids in the overall electrical insulation of the insulation system 24.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
   a casing;
   strands of an electrically conducting material; and
   an electrical insulation system comprising a strand insulation, a turn insulation, and a ground wall insulation, wherein
   the strand insulation comprises a PEEK composite comprising layered nanoparticles dispersed in a thermoplastic PEEK matrix and insulates each strand of the electrically conducting material, wherein
   the turn insulation and the ground wall insulation comprise a layered insulation tape comprising:
      a first layer comprising a mica paper and a binder resin, wherein an amount of the binder resin is in a range from about 5 wt % to about 12 wt % of the layered insulation tape; and
      a second layer backing the first layer, wherein the second layer comprises a PEEK composite comprising layered nanoparticles dispersed in the thermoplastic PEEK matrix in an amount ranging from about 20 wt % to about 30 wt % of the second layer, and wherein the second layer laminates the first layer, wherein
         the layered insulating tape of the turn insulation is in contact with and insulates a group of insulated strands of the electrically conducting material to form turn-insulated conductor strands, and wherein
   the ground wall insulation is located between the turn-insulated conductor strands and the casing, and wherein
   a vacuum impregnated resin is located between strands of the electrically conducting material and the strand insulation, wherein the vacuum impregnated resin comprises finely dispersed nanofillers comprising alumina, silica, titania, boron nitride, aluminum nitride, aluminum silicate, nanoclay, or talc and present in a range from about 0.1 wt % to about 3 wt %.

2. The system of claim 1, wherein the nanofillers have an average particle size less than 100 nanometers.

3. The system of claim 1, wherein at least a portion of the nanofillers comprises agglomerates, wherein the agglomerates have an average agglomerate size of less than 1 micrometer.

4. The system of claim 1, wherein the nanofillers comprise silane functional groups.

5. The system of claim 1, wherein the layered nanoparticles comprise nanoclay.

6. The system of claim 1, wherein the layered nanoparticles comprise talc.

7. The system of claim 1, wherein the layered nanoparticles have an aspect ratio in a range from about 10 to about 100.

8. The system of claim 1, wherein the first layer of the layered insulated tape is proximate to the insulated strands of the conducting material.

9. The system of claim 1, wherein the electrically conducting material comprises copper.

\* \* \* \* \*